Sept. 20, 1966  D. W. KERST  3,274,435
METHOD OF INJECTING AND TRAPPING PARTICLES IN A STATIC MAGNETIC
CONFINING FIELD BY BUNCHING PARTICLES IN A BEAM
Filed Feb. 16, 1960
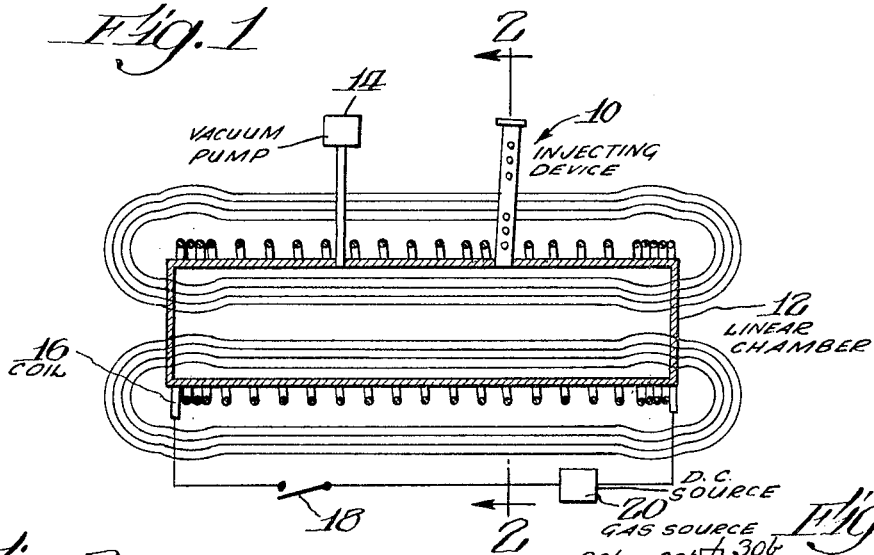
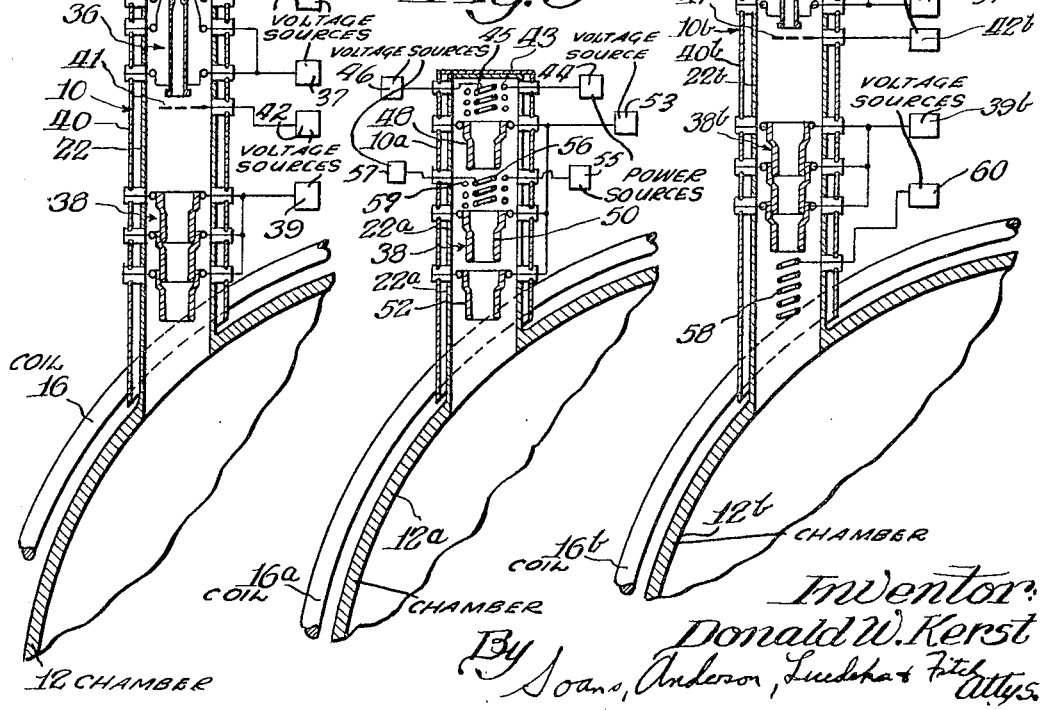
Inventor:
Donald W. Kerst United States Patent Office
3,274,435
Patented Sept. 20, 1966

3,274,435
METHOD OF INJECTING AND TRAPPING PARTICLES IN A STATIC MAGNETIC CONFINING FIELD BY BUNCHING PARTICLES IN A BEAM
Donald W. Kerst, La Jolla, Calif., assignor to General Dynamics Corporation, New York, N.Y., a corporation of Delaware
Filed Feb. 16, 1960, Ser. No. 9,046
5 Claims. (Cl. 315—111)

The present invention relates generally to particle injecting methods and more particularly to a method of injecting and trapping charged particles in a confining field.

A fundamental difficulty exists in injecting charged particles into containment vessels such as accelerators, plasma containment vessels, etc., which utilize magnetic fields to confine the particles. Charged particles move in spiral paths in a static magnetic field, and the particles injected into such containment vessel eventually come back and strike the source of injecting structure. In order to prevent such interception of the particles, the path of travel of the particles in the magnetic field must be changed. this may be accomplished by altering the magnitude of the magnetic flux density, the magnitude of the charge on the particles, the speed of the particles, or the mass of the particles after the particles have entered the magnetic field.

Generally, in previously available injecting methods either the magnetic field or the mass of the particles has been changed to trap the particles in the confining magnetic field. For example, in one previously available method of injecting particles into a plasma containment vessel, the mass of the particles has been changed by passing a beam of molecular ions through a direct current carbon arc disposed within the containment vessel, the carbon arc dissociating the molecular ion into an atomic ion and a neutral atom. The neutral atom escapes immediately from the vessel, and the atomic ion, since it is positively charged and is half the mass of the original molecule, is trapped by the confining field. It has been found that this injecting method has certain inherent disadvantages. Impurities are introduced into the system by the carbon arc, and only half of the mass of the particles in the beam is utilized.

An object of the present invention is the provision of a novel method of injecting and trapping charged particles in a confining field. Another object of the invention is the provision of a method for injecting particles into a containment vessel which is provided with a magnetic field to confine the movement of the particles. Still another object is the provision of a method of changing the velocity or energy of the particles after the particles enter a containment vessel having a confining magnetic field established therein.

Other objects and advantages of the present invention will become apparent by reference to the following description and accompanying drawings.

In the drawings:
FIGURE 1 is a schematic side elevational view of an apparatus for injecting and trapping charged particles in a confining field in accordance with the present invention; portions of the apparatus being broken away to show the interior construction thereof;
FIGURE 2 is an enlarged fragmentary cross-sectional view taken generally along line 2—2 of FIGURE 1;
FIGURE 3 is a cross-sectional view similar to FIGURE 2 showing another embodiment of apparatus for injecting and trapping charged particles in a confining field in accordance with the present invention; and
FIGURE 4 is a cross-sectional view similar to FIGURES 2 and 3 showing still another embodiment of apparatus for injecting and trapping charged particles in a confining field in accordance with the invention.

In accordance with the present invention particles are injected and trapped in a gas-tight chamber having a magnetic confining field established therein by providing organized bunches of particles, injecting the organized bunches of particles into the confining field, and disorganizing said bunches in the confining field whereby particles are trapped in the confining field.

For purposes of clarity, the method of injecting and trapping charged particles in a confining field will hereinafter be described as it is applied to the illustrated apparatus. However, it should be understood that the method is applicable for injecting and trapping charged particles in various other apparatus.

Now referring to the drawings, FIGURES 1 and 2 show an injecting device 10 adapted to inject high energy ions into a linear chamber 12 composed of a material having a good heat stability and a low atomic number, such as a ceramic. Other shapes of chambers may be used, such as toroids, figure 8's etc. without departing from the invention.

The chamber 12 is evacuated of neutral gas and other contaminating substances by a suitable vacuum pump 14 connected thereto. The vacuum pump 14 should be of sufficient capacity to maintain the neutral gas density within the chamber 12 at a sufficiently low value to prevent neutralization of the high energy particles injected into the chamber 12.

As shown particularly in FIGURE 1, a confining magnetic field, which is generated by a single helical coil 16 disposed about the chamber walls, extends axially within the chamber 12. The ends of the chamber 12 are provided with a greater number of turns in order to afford strong fields at the ends which constitute conventional "magnetic mirrors." The coil 16 is connected through a switch 18 to a suitable source 20 of direct current electrical power. Other well-known means may be used to set up the confining fields, such as one or more toroidal magnetic coils disposed along the chamber, concentric tubular members, etc.

The illustrated injecting device 10 is connected to the side wall of the chamber 12 and extends approximately tangentially to a circle of a slightly smaller radius than the radius of the chamber 12. Also, the injecting device 10 is disposed at a slight angle to longitudinal dimension of the chamber 12 so that the injected particles, which are trapped as hereinafter described, move longitudinally of the chamber 12.

The injecting device 10 is illustrated particularly in FIGURE 2, is a conventional Cockcraft-Walton Accelerator and includes a tubular accelerating member 22 extending from the chamber 12, and an ion source 24 connected to the outer end of the accelerating member 22.

In the ion source 24, a voltage source 26 is connected between a filament 28, which is heated by a power source 29, and a plate 30, which is spaced from the filament 28, to produce a stream of electrons therebetween. The electrons bombard gas atoms provided by a source 32 of suitable gas, such as deuterium, communicating with the interior of the ion source 24. Positive ions produced by the bombardment are withdrawn from the ion source 24 by a negatively charged tubular probe 34 disposed in the accelerating member adjacent the ion source 24, the probe 34 being connected to source 35 of negative voltage. The ions are focused, by a commonly known electrostatic lens 36 connected to a suitable source 37 of power, the lens being disposed axially along the accelerating member 22. Tubular accelerating electrodes 38, which are connected to a suitable source 39 of power, are provided in the accelerating member 22 to accelerate the ions.

A tubular magnetic shield 40 is concentrically disposed about the accelerating member 22 to prevent the magnetic confining field from affecting the ion beam within the injecting device 10.

In order to make possible the trapping of the ions, in accordance with the invention, the beam of ions is organized into discrete bunches of ions. In the embodiment illustrated in FIGURE 2, the beam is organized into discrete bunches of ions by velocity modulating the beam with a grid 41 disposed in the path of the beam between the lens 36 and the tubular accelerating electrodes 38. The grid 41 is connected to a source 42 of voltage which varies the voltage of the grid 41 about a direct current voltage approximately equal to the voltage of the lens 36. Accordingly, as ions pass through the grid 41, they are either accelerated or decelerated, depending upon the phase of the A.-C. voltage on the grid 41. As the velocity modulated beam passes through the accelerating tube 22, the higher-velocity ions overtake the lower-velocity ions which left the grid 41 at an earlier phase. This results in a bunching of the ions, that is, a group of a large number of high energy ions is followed by a group of a small number of lower energy ions.

After the organized beam enters the chamber 12 it becomes disorganized and trapped in the following manner. When the beam enters the magnetic field set up wthin the chamber 12, the ions at the front of each bunch of high energy ions are accelerated because of the space charge existing between the forward ions and the rest of the ions within the bunch. The ions to the rear of the bunch are decelerated since the space charge repels these ions in a direction opposite the movement of the particles. The ions in the bunch are also caused to change direction by mutual repulsion thus resulting in the spreading of the bunch. Only the ions in the center of the bunch retain their same energy. Since the velocities of the majority of ions in each bunch are changed in this manner, the path of travel of the ions within the confining magnetic field are thereby changed. Of course, a certain number of the ions have their velocities changed, and thus their paths of travel, in such a way that they strike the wall of the chamber 12 or the inner end of the injecting device 10. However, a large proportion of the ions are trapped within the confining field. The continued disorganization of the particles in the bunch after they are within the chamber insures that the bunch cannot reform with sufficient density to deflect the particles onto paths which lead them out of the chamber 12.

It should be understood that there is a limit to the number of ions which may be trapped in the confining field. As the density of the confined ions increases more ions are scattered out of the confining field. Finally, an equilibrium density of confined ions is reached where as many confined ions are scattered out as new ions are trapped.

A 100 milli-ampere beam of deuterons injected into the vacuum chamber 12 at an energy of 200 kv. will produce a little more than $10^9$ particles/cm.$^3$ in a 1 sq. cm. beam. When this beam is subjected to velocity modulation such that the beam is formed into 2 centimeter bunches of high energy ions with 8 centimeters of space between bunches, the electric field at the edge of each bunch is approximately 2,000 volts per centimeter and for each 10 centimeters of travel in the magnetic field, the particles at the front of the bunch are accelerated 20 kv., and the particles at the rear of the bunch are decelerated 20 kv. In addition, the particles at the sides of the bunch are caused to change direction or spread approximately 3 degrees in 10 centimeters of path. This is sufficient to cause a large number of particles in the injecting beam to acquire paths such that they remain in the confining field of the chamber in accordance with the mechanism set forth above.

A second apparatus for injecting charged particles into a chamber in accordance with the present invention is shown in FIGURE 3 wherein parts similar to those in FIGURE 1 are designated with the same reference numerals followed by the subscript "a." In this embodiment two beams of charge particles having different average velocities are injected into the chamber 12a. Before entering the chamber 12a, at least one of the beams is velocity modulated. Because of the interaction between the beams within the confining field, a large proportion of the particles have their energies changed and hence are trapped within the confining field.

In the embodiment shown in FIGURE 3, a first beam of electrons is provided by an electron source 43 which is connected to a power source 44. The beam is velocity modulated by a grid 45 which is connected to a varying positive voltage supply 46. The beam is accelerated by tubular accelerating electrodes 48, 50 and 52, which are connected to a voltage source 53 and which are sequentially disposed along the accelerating member 22a. Disposed between two of the accelerating electrodes 48 and 50 is a second electron source 54 which provides a beam of electrons which is slightly lower in average velocity than the first beam. The electron source 54 is connected to a power source 55. A grid 56 for velocity modulating the slower beam is provided in the path of the beam. The grid 56 is connected to a varying positive voltage supply 57.

As each beam moves along the accelerating member 22a the electrons therein become organized into discrete bunches. As the beams move along together, the bunches of lower velocity electrons in the fast beam tend to move along in adjacent relationship with the bunches of higher velocity electrons in the slow beam because of higher space charge repulsion between the bunches of higher velocity electrons in the fast beam and the bunches of higher velocity electrons in the slow beam. Therefore, since the interacting beams have different average velocities, the slow beam is accelerated (gains energy) and the fast beam is retarded (loses energy). The interaction between the beams also amplifies the bunching, that is, reduces the length of the bunches of higher velocity electrons and thereby increases the density of electrons in each bunch. This results in an increase in the space charge within the bunches.

After the beams enter the confining field further changes of energy of the electrons due to the interaction between the beams, changes the orbits of the electrons and, therefore, promotes trapping of a substantial portion of the electrons. In addition, space charge repulsion within the bunches changes the energy of the electrons as the bunches pass through the confining field.

While preferably for best results both beams are velocity modulated, it should be understood that only one beam may be velocity modulated since the initial bunching of the one beam is somewhat amplified by employing a continuous stream of electrons in the second beam. Also, even without a velocity modulating grid, a beam of electrons will have a tendency to become somewhat bunched because, for example, of the variance in emission of electrons from a filament. Accordingly the improved results of this invention may, to a limited extent, be obtained without the use of modulating grids on one or both beams.

The amplification of bunching produced by the interaction of the beams, and thus the changes of energy of the electrons in the beams, depends upon the initial velocity modulation of the beams, the current density of the beams, the average velocity of the beams and the distance traveled by them beams. The amplification is a maximum when the separation between the average velocity of the beams is small and it decreases as the separation is further increased. Similarly, the amplification is at an optimum for a certain frequency of velocity modulation and decreases as the frequency is increased or decreased. However, the frequency may be varied considerably without substantially affecting the amplification. Within limits the amplification increases with distance traveled by the interacting beams.

If the chamber 12 contains a plasma, that is, a hot gas composed of free ions and electrons, the plasma itself may be employed as one of the beams. In this embodiment, a beam of bunched ions is provided in a similar manner to that described in connection with FIGURES 1 and 2. When the beam is of a suitable velocity and current and is injected into the chamber, the bunches of high energy ions passing through the plasma cause the plasma ions to oscillate or become bunched. The plasma oscillations occur because the bunches of charged ions in the beam repel the ions in the plasma so that ions within the plasma tend to bunch in the spaces between bunches of ions in the beam. The plasma oscillations, in turn, interact back upon the bunches of ions in the beam to thereby amplify the bunching, that is, decrease the length of the bunches and increase the density of ions in each bunch. Consequently, the orbits of the ions are changed because of space charge repulsion within each bunch and because of energy lost by the ions in the beam in setting up the plasma oscillations.

FIGURE 4 shows an apparatus by which neutral plasma may be injected and trapped in a chamber. In this embodiment, wherein similar parts to those shown in FIGURE 2 are indicated by the same reference numeral with the subscript "b," a beam of bunched positive ions is neutralized by passing the beam through a cloud of electrons. As illustrated, the cloud of electrons is provided by a source of electrons, such as a filament 58 connected to a power source 60, which filament is disposed at the end of the accelerating member 22b in the path of travel of the beam. The chamber 12b is initially provided with a confined plasma by a suitable means.

When the bunched beam of neutral plasma enters the chamber 12b, the ions therein repel the ions in the stationary plasma and the electrons repel the electrons in the plasma and create plasma oscillations therein. Creating such oscillations alters the energy of the ions in the neutral plasma and thus the paths of travel of the ions and electrons in the neutral plasma are changed.

Preferably, for optimum results the beam is velocity modulated. However, because of normal fluctuations, an unmodulated beam will also create plasma oscillations to a limited extent.

It should be understood that the length of the bunches, velocities of the particles, and the currents in the beams in the above described injecting devices are related to the particle densities involved in the interacting plasmas or beams. While the lengths, velocities and currents are not ordinarily critical the results may be optimized by the proper selection of values.

Various changes and modifications may be made in the above described particle injecting and trapping method without departing from the scope of the invention. Various features of the invention are set forth in the accompanying claims.

I claim:
1. A method of injecting particles into an evacuated gas-tight chamber from a source of particles external of said chamber and trapping the particles in said chamber in a static magnetic confining field established therein, said magnetic confining field being shaped as by magnetic mirrors or toroidal magnetic coils substantially to trap the particles three-dimensionally against escape in any direction, said method comprising subjecting a beam of particles from said source to phase bundling whereby the particles are organized into discrete bunches, and injecting the bunches of particles into the chamber at an angle to said confining field whereby the bunches become disorganized within the chamber thereby trapping particles in the field.

2. A method of injecting particles into an evacuated gas-tight chamber from a source of particles external of said chamber and trapping the particles in said chamber in a static magnetic confining field established therein, said magnetic confining field being shaped as by magnetic mirrors or toroidal magnetic coils substantially to trap the particles three-dimensionally against escape in any direction, said method comprising providing at least one beam of particles, from said source subjecting said beam of particles to phase bundling whereby the particles are organized into a series of bunches of particles, and delivering said beam into said chamber at an angle to said confining field whereby said buches of particles become disorganized.

3. A method of injecting particles into an evacuated gas-tight chamber from a pair of sources of particles external of said chamber and trapping the particles in said chamber in a static magnetic confining field established therein, said magnetic confining field being shaped as by magnetic mirrors or toroidal magnetic coils substantially to trap the particles three-dimensionally against escape in any direction, said method comprising providing a pair of parallel beams of particles, from said sources, organizing at least one of said beams into a series of bunches, the average velocity of the particles in one beam being faster than the average velocity in the other beam, and delivering said beams into said chamber at an angle to said confining field whereby said bunches become disorganized.

4. A method of injecting particles into an evacuated gas-tight chamber from a source of particles external of said chamber and trapping the particles in said chamber in a static magnetic confining field established therein, said magnetic confining field being shaped as by magnetic mirrors or torodial magnetic coils substantially to trap the particles three-dimensionally against escape in any direction, said method comprising providing a plasma in said chamber, providing a beam of particles from said source, organizing said beam of particles into a series of bunches of particles, and delivering said beam into said chamber at an angle to said confining field whereby said bunches become disorganized.

5. A method of injecting particles into an evacuated gas-tight chamber from a source of positive ions external of said chamber and trapping the ions in said chamber a static magnetic confining field established therein, said magnetic confining field being shaped as by magnetic mirrors or toroidal magnetic coils substantially to trap the ions three-dimensionally against escape in any direction, said method comprising providing a beam of positive ions from said source, organizing said beam into a series of bunches of ions, passing said beam through a cloud of electrons, and delivering said beam into said chamber at an angle to said confining field whereby said bunches become disorganized.

References Cited by the Examiner
UNITED STATES PATENTS

| | | | |
|---|---|---|---|
| 2,395,647 | 2/1946 | Strobel | 331—80 |
| 2,469,964 | 5/1949 | Hartman | 315—5.24 X |
| 2,764,707 | 9/1956 | Crawford et al. | 313—63 |
| 2,789,221 | 4/1957 | Tobias | 328—233 |
| 2,839,706 | 6/1958 | Anderson et al. | 313—63 X |
| 2,874,326 | 2/1959 | Christofilos et al. | 315—5.51 |
| 2,883,580 | 4/1959 | Kilpatrick | 315—111 |
| 2,945,972 | 7/1960 | Blue | 313—63 |
| 3,069,344 | 12/1962 | Post et al. | 313—161 X |

JAMES W. LAWRENCE, *Primary Examiner.*

GEORGE WESTBY, RALPH NILSON, *Examiners.*

P. J. SCHLESINGER, V. LAFRANCHI,
*Assistant Examiners.*